United States Patent [19]
Fumex

[11] Patent Number: 6,145,548
[45] Date of Patent: Nov. 14, 2000

[54] CONNECTOR FOR LOOM CONNECTING ROD AND DRAWING MECHANISM

[75] Inventor: André Fumex, Talloires, France

[73] Assignee: Staubli Faverges, Faverges, France

[21] Appl. No.: 09/261,394

[22] Filed: Mar. 3, 1999

[30] Foreign Application Priority Data

Mar. 19, 1998 [FR] France ................................. 98 03632

[51] Int. Cl.[7] .............................. D03C 1/14; D03C 1/16; F16B 1/00; F16C 11/04
[52] U.S. Cl. ........................ 139/57; 139/82; 403/408.1; 403/297; 74/105
[58] Field of Search .................. 139/82, 57; 403/408.1, 403/297; 74/105

[56] References Cited

U.S. PATENT DOCUMENTS

| | | | |
|---|---|---|---|
| 4,185,666 | 1/1980 | Heiniger | ..................................... 139/82 |
| 4,556,337 | 12/1985 | Marshall | ................................... 403/255 |
| 5,255,719 | 10/1993 | Froment . | |
| 5,348,054 | 9/1994 | Oertli . | |
| 5,685,346 | 11/1997 | Froment et al. | ........................... 139/57 |

FOREIGN PATENT DOCUMENTS

| | | |
|---|---|---|
| 0598165 | 5/1994 | European Pat. Off. . |
| 0807702 | 11/1997 | European Pat. Off. . |
| 2162598 | 7/1973 | France . |
| 2676467 | 11/1992 | France . |

*Primary Examiner*—Andy Falik
*Attorney, Agent, or Firm*—Dowell & Dowell, P.C.

[57] ABSTRACT

A connector for a drawing mechanism including at least one tubular connecting rod of flattened cross section for connecting the connecting rod to a rocking lever of a heddle mechanism wherein the connector includes two cheeks adapted to be disposed on opposite sides of the lever and where at least two generally parallel pins include first ends which are welded to inner faces of the cheeks. The pins include second ends adapted to be connected within the connecting rod and which second ends are spaced from the first ends by a deformable portion of each pin.

12 Claims, 5 Drawing Sheets

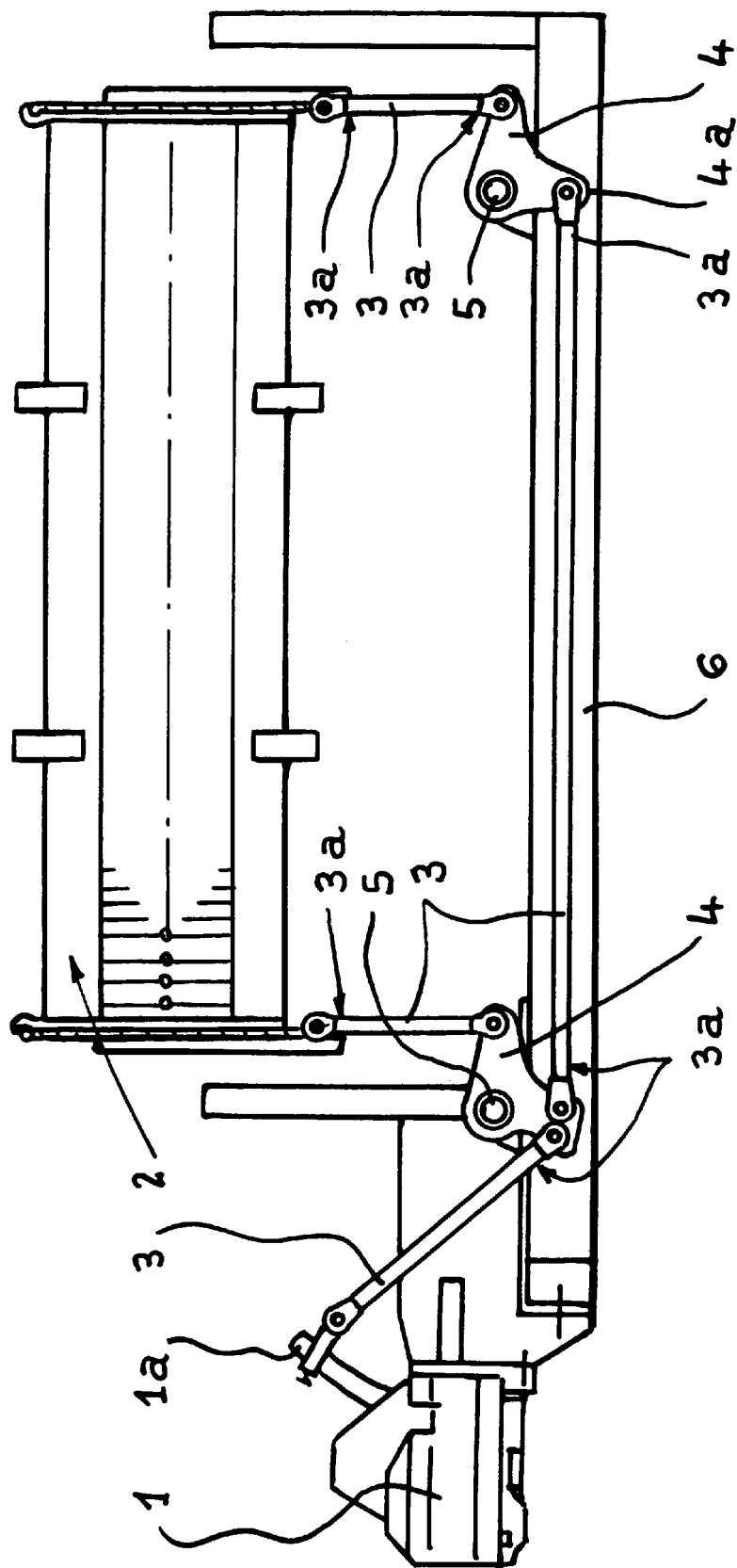

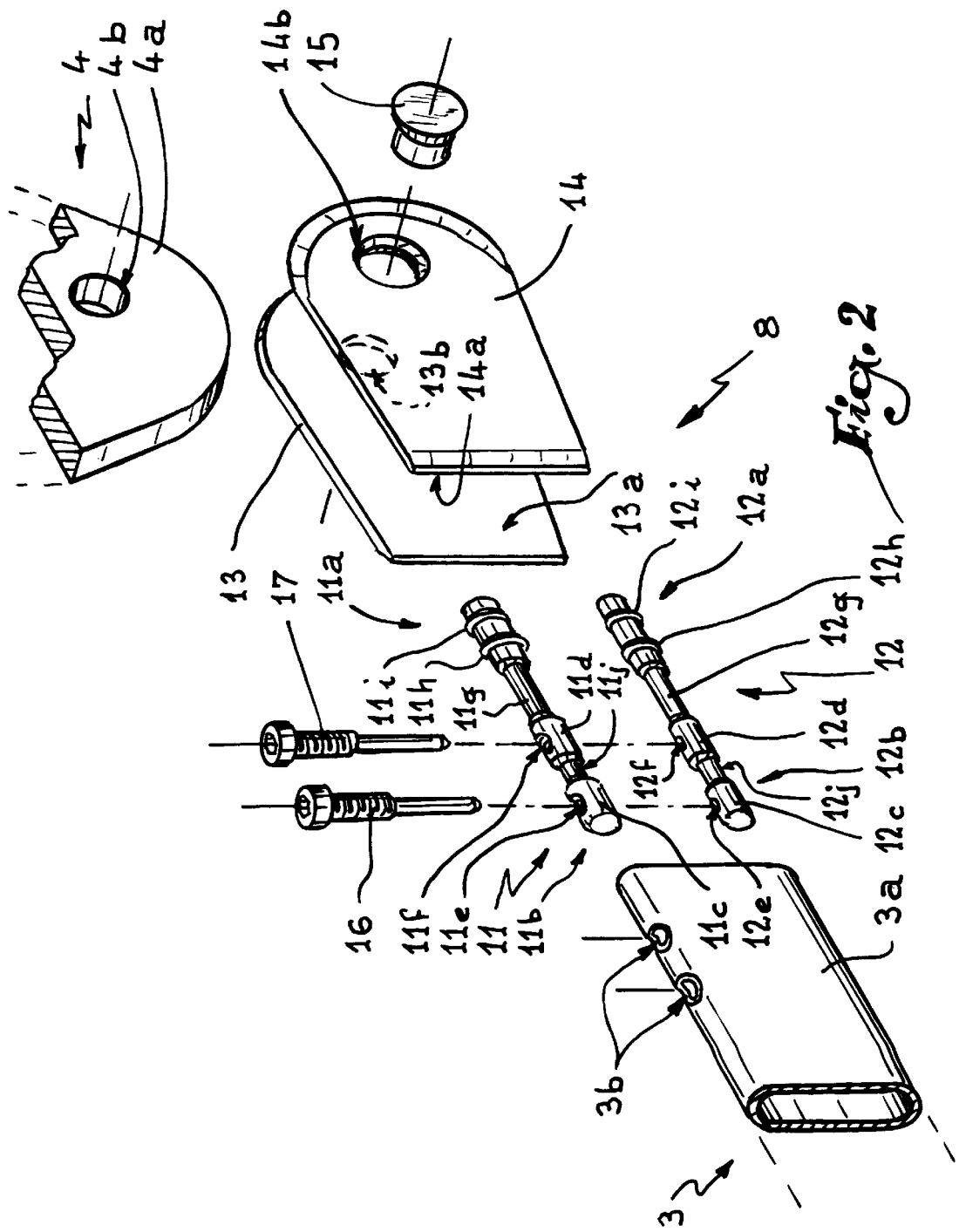

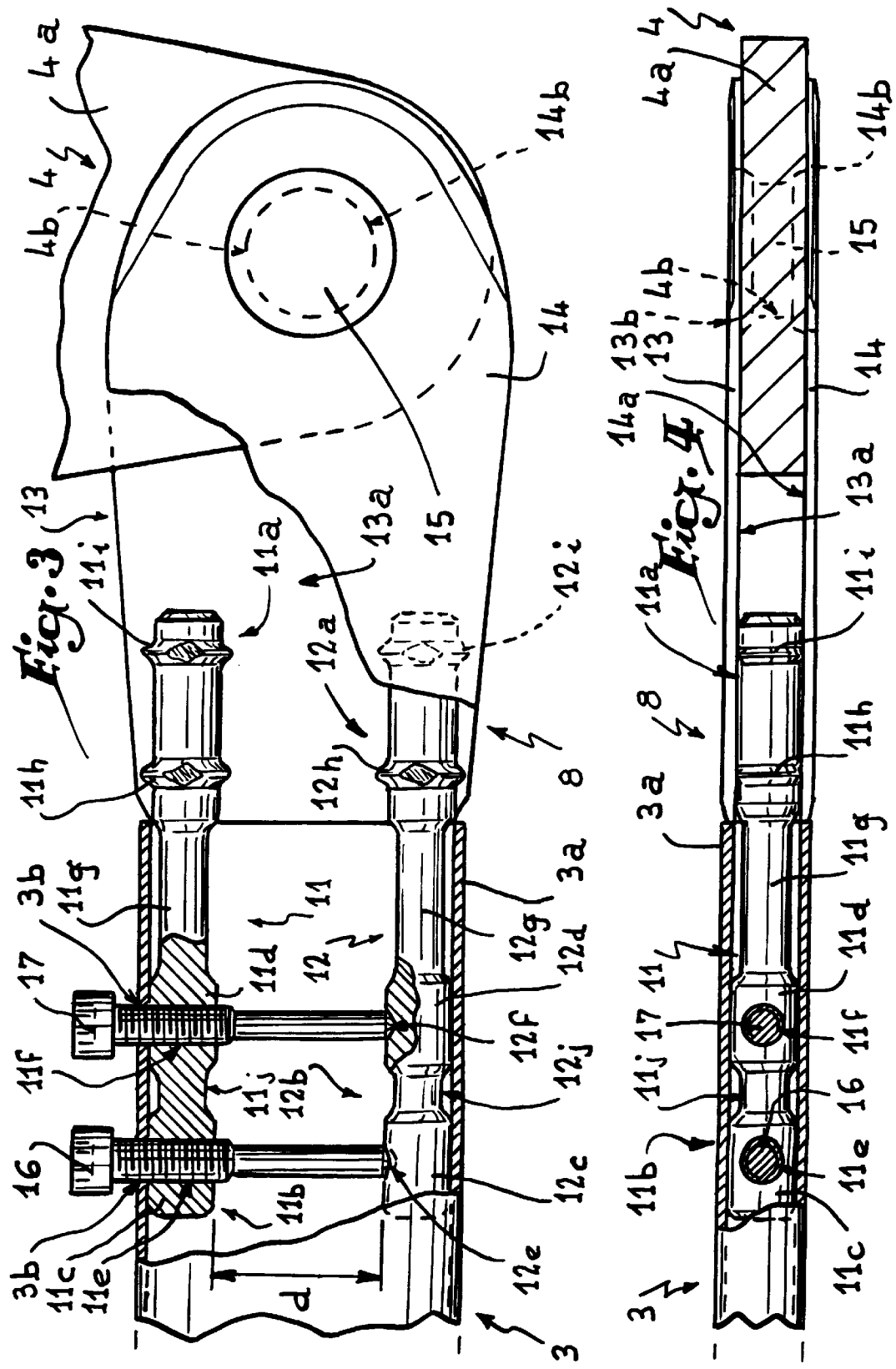

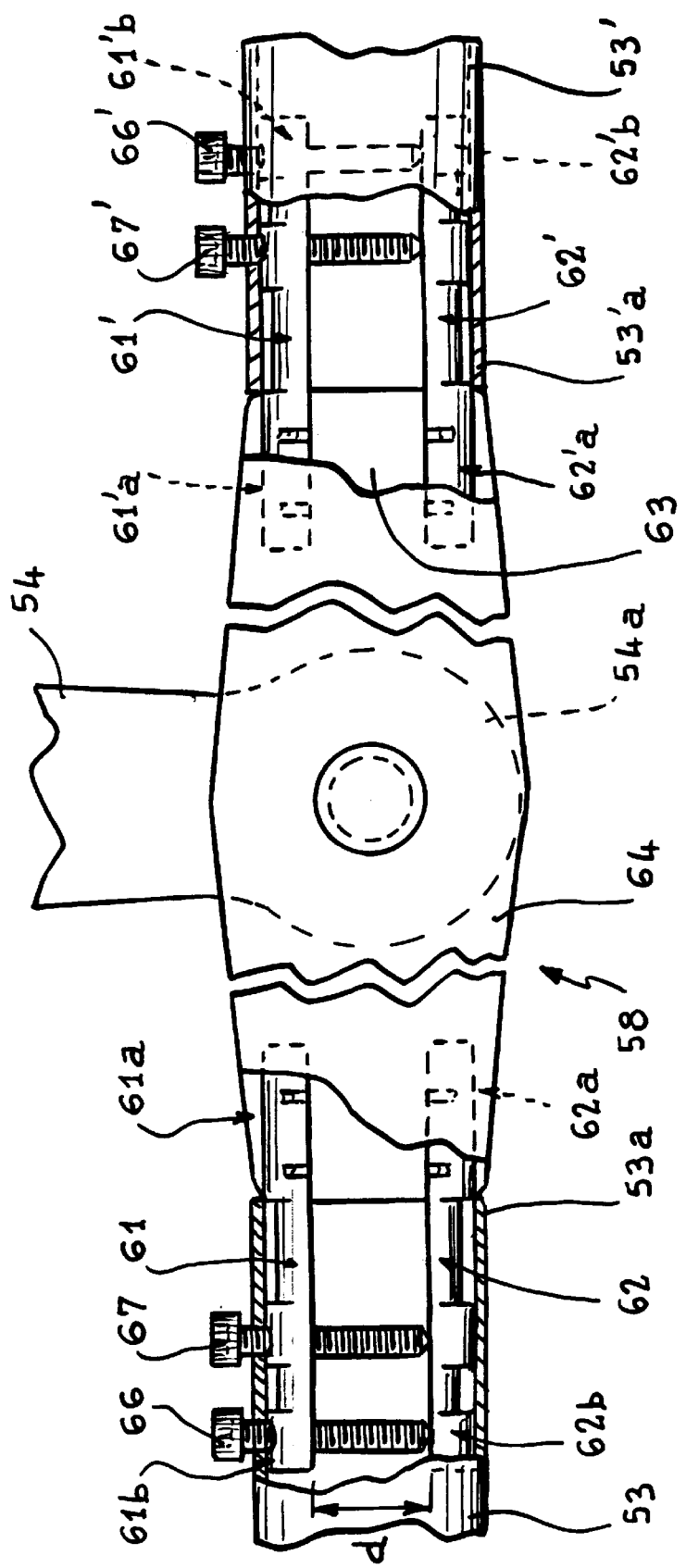

CONNECTOR FOR LOOM CONNECTING ROD AND DRAWING MECHANISM

FIELD OF THE INVENTION

The present invention relates to a drawing mechanism associated with a dobby or to another weaving system for forming the shed on a weaving loom. It aims more particularly at the mechanisms for drawing connecting rods which ensure coupling of the mobile actuating members of such a system with the vertically mobile heddle frames mounted on the loom. The invention also relates to a weaving loom equipped with such a mechanism.

BACKGROUND OF THE INVENTION

In conventional devices, the connectors of the connecting rods are not dismountable. Cheeks are created at the ends of the connecting rods by cut-out, which lead to weakening these connecting rods mechanically. Taking into account the operational speeds of modern weaving looms and the intensity of the efforts transmitted by the drawing mechanism, this may result in a connecting rod breaking, particularly at the level of its coupling with an adjacent lever.

Document FR-A-2 676 467 discloses a drawing mechanism which partially solves these problems, in which a tubular connecting rod of flattened cross-section is provided with at least one connector comprising two cheeks, provided to be disposed on either side of a rocking lever and articulated on this lever, and at least one part adapted to penetrate and to be immobilized in one end of the connecting rod.

The first device described in this document comprises two longitudinally scalloped cheeks defining two elongated edges intended to cooperate with pushers provided to be inserted inside one end of the connecting rod. It has proved to be difficult to obtain shapes of the jaws and pushers which allow an efficient bearing inside the end of the connecting rod, with the result that anchoring of the connector inside the connecting rod is not optimum. In addition, this device comprises a plurality of distinct pieces which may be separated from one another and the risk of loss of the pieces during dismantling cannot be excluded.

This document also discloses a second version of a connector which comprises two cheeks forming a one-piece element with two deformable parts intended to be housed inside the end of the connecting rod. Such an element, of complex shape, is difficult to produce industrially at an acceptable cost, while it must be made with great precision in order to cooperate efficiently with the connecting rod and the lever with which it must be associated.

It is a more particular object of the invention to overcome these drawbacks by proposing a novel connecting rod connector structure which may be produced more economically, while presenting satisfactory rigidity and fit to the shapes of the connecting rod and lever.

SUMMARY OF THE INVENTION

To that end, the invention relates to a drawing mechanism interposed between a weaving system and the heddle frames of a weaving loom, of the type comprising at least one tubular connecting rod of flattened cross-section which, to be coupled to at least one rocking connection lever, is provided with at least one connector comprising two cheeks provided to be disposed on either side of the lever and articulated on this lever, and at least one part adapted to penetrate and to be immobilized in one end of the connecting rod, characterized in that the part adapted to penetrate in the end of the connecting rod is formed by two substantially parallel pins, each pin comprising a first end disposed between the two cheeks and welded on the opposite faces of these two cheeks, and a deformable part enabling the distance separating the second ends of the pins, inside the connecting rod, to be adjusted.

The connector of the drawing mechanism of the invention presents an excellent rigidity while its cost price is particularly attractive due to the simplicity of the parts constituting it. The cheeks may be obtained by any appropriate means, particularly by cut-out. The pins may be manufactured by turning or sintering, these two types of operations being suitably mastered industrially, from the standpoint of both quality and economics. Welding of the pins between the cheeks may be effected with high precision, this resulting in a precise positioning of the pins and an optimum cooperation between the complementary surfaces of the pins and the connecting rod.

According to a first advantageous aspect of the invention, the deformable part is constituted by a part of each pin of reduced cross-section. The more or less deformable nature of each pin may thus be defined by the cross-section of the deformable part.

According to another advantageous aspect of the invention, each pin is provided, near its second end, with a recess defining two parts adapted to cooperate with means for adjusting the distance separating the second ends of the pins and to come into abutment against an inner surface of the connecting rod. This recess makes it possible to localize the efforts of contact of each pin with the inner surface of the connecting rod at the level of the parts cooperating with the adjusting means. The zones of contact between the pins and the connecting rod are of relatively small area, which improves the intensity of the effort of thrust exerted on the connecting rod. In that case, those parts of the pins adapted to cooperate with the adjusting means are provided to present a cross-section greater than that of the cross-section of the deformable part.

Those parts of the pins adapted to cooperate with the adjusting means are advantageously provided with bores for receiving and/or centering adjusting screws. The bores of a first pin may be provided to be through-bores, tapped to the pitch of the adjusting screws, while the bores of the second pin are blind. The bores of the second pin are intended to receive the ends of the adjusting screws.

According to another advantageous aspect of the invention, each pin bears, near its first end, at least one bead for welding on the cheeks.

According to another advantageous aspect of the invention, each cheek is essentially formed by cut-out, this producing a particularly economical piece with good dimensional tolerances.

According to an advantageous embodiment of the invention, the connector comprises four pins adapted to cooperate with the ends of two connecting rods with a view to fastening them on a lever, these four pins being welded between the two cheeks.

The invention also relates to a weaving loom incorporating a drawing mechanism as described hereinabove. The cost price of such a weaving loom is attractive, while the operations of maintenance, particularly of preventive maintenance by changing the connecting rods, may be carried out relatively simply.

BRIEF DESCRIPTION OF THE DRAWINGS

The invention will be more readily understood and other advantages will be more clearly apparent from the following description of two embodiments of a drawing mechanism for weaving loom in accordance with its principle, given solely by way of example and with reference to the accompanying drawings, in which:

FIG. 1 schematically shows the principle of a weaving loom according to the invention.

FIG. 2 is an exploded view in perspective of the elements constituting a connector for coupling a connecting rod on a rocking lever of the loom of FIG. 1.

FIG. 3 is a side view, with parts torn away, of a coupling made with the elements of FIG. 2.

FIG. 4 is a plan view of the coupling of FIG. 3.

FIG. 5 is a side view, with parts torn away, of a coupling made thanks to a connector according to a second embodiment of the invention.

DESCRIPTION OF PREFERRED EMBODIMENTS

Figure 6:
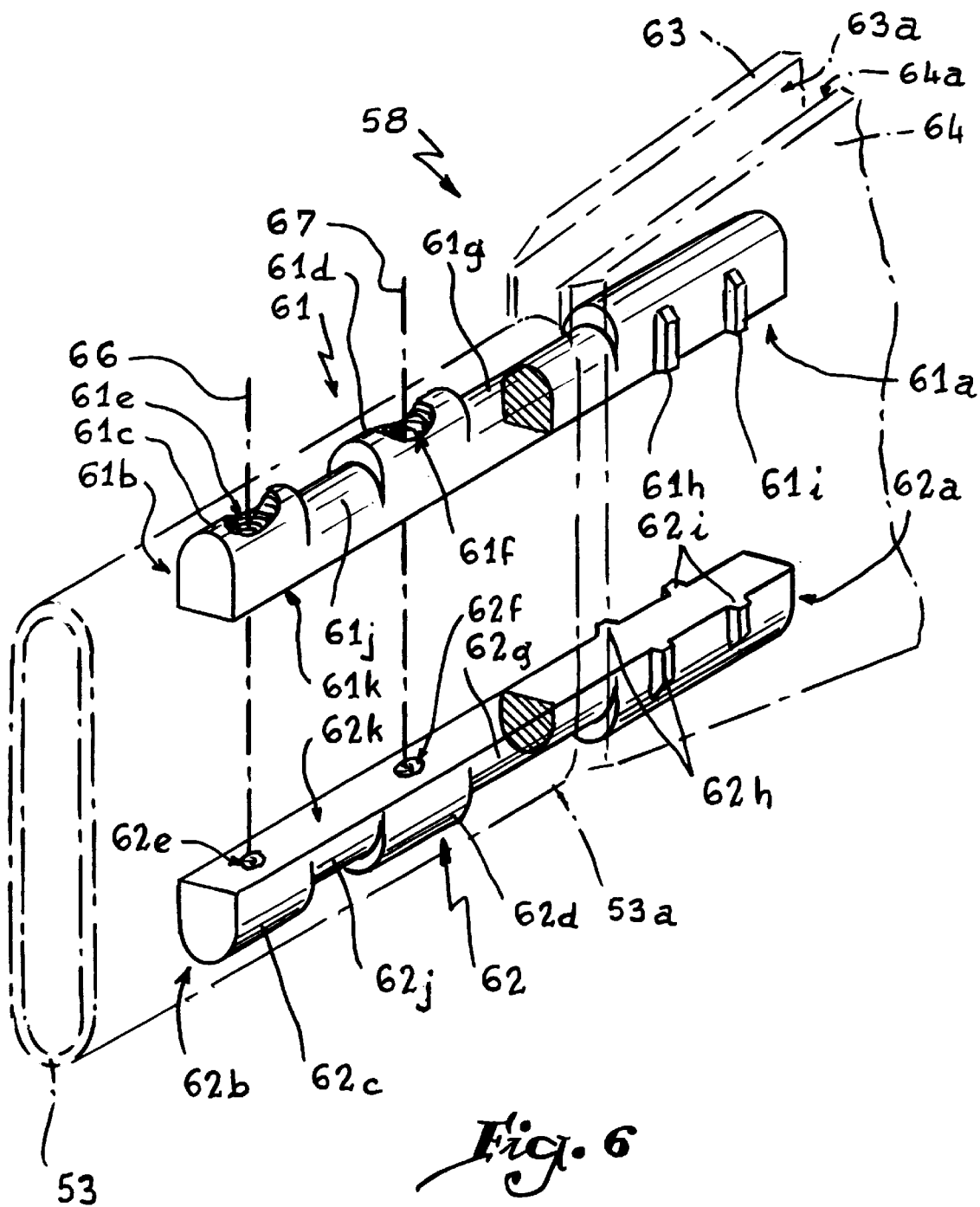
FIG. 6 is a view in perspective of two pins of the connector of FIG. 5 in assembled position.

Referring now to the drawings, FIG. 1 shows a dobby 1 intended to drive a heddle frame 2 of a weaving loom in a vertical rocking movement. To that end, an actuation arm 1a of the dobby 1 is coupled by a series of connecting rods 3, oriented obliquely, horizontally or vertically, to two rocking levers 4 mounted on either side of the loom and articulated about shafts 5 fixed with respect to the frame 6 of the loom.

FIG. 2 shows more particularly that each connecting rod 3 is provided to be in the form of a tube with flattened cross-section. The end of the connecting rod visible in FIGS. 2 to 4 and which is intended to be coupled to an end 4a of a lever 4, is referenced 3a. A connector 8 is provided for coupling the elements 3a and 4a.

This connector is essentially constituted by two pins 11 and 12 and two cheeks 13 and 14 intended to be welded together in the configuration shown in FIGS. 3 and 4. More precisely, pins 11 and 12 comprise a first end 11a and 12a provided to be welded on the opposite faces 13a and 14a of the cheeks 13 and 14, these faces being provided to surround the end 4a of the lever 4. Cheeks 13 and 14 each present an orifice 13b and 14b adapted to be aligned with a central orifice 4b in end 4a, for the passage of a stud or rivet 15 or of a screw and nut.

Furthermore, the pins 11 and 12 comprise, at their respective second ends 11b and 12b, two parts 11c and 11d, and 12c and 12d respectively, intended to cooperate with the screws 16 and 17 for adjusting the spacing of the ends 11b and 12b inside the end 3a of the connecting rod 3.

The end 3a of the rod 3 comprises two bores 3b for passage of screws 16 and 17 when the ends 11b and 12b of the pins 11 and 12 are introduced inside the end 3a, as shown in FIGS. 3 and 4.

It will be noted that the screws 16 and 17 traverse parts 11c and 11d of the pin 11 in which are defined two tapped orifices 11e and 11f whose tappings are adapted to cooperate with the threads of screws 16 and 17. Furthermore, parts 12c and 12d of pin 12 present blind bores 12e and 12f for receiving and centering the ends of the screws 16 and 17.

In the position of FIGS. 3 and 4, the act of screwing the screws 16 and 17 tends to make parts 11c and 11d of pin 11 advance towards the head of screws 16 and 17, which has for its effect to move apart the second ends 11b and 12b of pins 11 and 12 and to block the connector 8 with respect to the connecting rod 3. The opposite effect, employed in particular for dismantling the coupling, is obtained by unscrewing the screws.

A deformable part is respectively defined on pins 11 and 12 by a zone 11g or 12g of reduced diameter, located between the ends 11a and 11b, 12a and 12b, respectively. By their suppleness, the deformable parts 11g and 12g allow adjustment of the distance d between the ends 11b and 12b or pins 11 and 12 by the action of screws 16 and 17.

As emerges more particularly from FIGS. 2 to 4, the pin 11 presents, at it first end 11a, two peripheral beads 11h and 11i for welding against the faces 13a and 14a of the cheeks 14 and 13. These beads 11h and 11i allow in particular hot-contact electric welding when the end 11a of pin 11 is disposed between cheeks 13 and 14. Similarly, beads 12h and 12i for welding are provided on pin 12. Assembly of the pins and cheeks by welding is both resistant and perfectly defined from the dimensional standpoint.

Furthermore, a groove 11j is defined between parts 11c and 11d of pin 11, with the result that the bearing of the pin 11 against the inner surface of end 3a of the connecting rod 3 is concentrated at the level of parts 11c and 11d, which improves anchoring of this pin in the end of the connecting rod. Similarly, a groove 12j is provided between parts 12c and 12d of pin 12.

In view of the foregoing, a particularly effective blocking of the pins 11 and 12 inside the connecting rod 3 may be obtained by cooperation of shapes between the inner surface of end 3a of the connecting rod 3 and parts 11c, 11d, 12c and 12d of pins 11 and 12 which are of overall circular cross-section and whose diameter is larger than that of the deformable zones 11g and 12g or than that of the bottoms of grooves 11j and 12j.

The connector 8 constituted by pieces 11 to 14 and 16 and 17 is economical, as each piece may be obtained by simple machining operations.

In particular, pins 11 and 12 are essentially obtained by turning, and the orifices or bores 11e, 11f, 12e and 12f are made in accordance with simple sequences of machining operations. As for cheeks 13 and 14, they are cut out from sheet metal, this allowing mass production with excellent dimensional tolerances.

In the second embodiment of the invention shown in FIGS. 5 and 6, elements similar to those of the embodiment of FIGS. 2 to 4 bear identical references increased by 50. A connector 58 connects two connecting rods 53 and 53' to an end 54a of a lever 54. The connector 58 is essentially constituted by four pins 61, 62, 61' and 62' and by two cheeks 63 and 64 intended to be welded together in the configuration shown in FIGS. 5 and 6.

Pins 61 and 62 are provided to penetrate in one end 53a of the connecting rod 53, while pins 61' and 62' are provided to penetrate in one end 53'a of connecting rod 53'. Each pin 61, 61', 62 or 62' comprises a first end 61a, 61'a, 62a or 62'a intended to be welded on the opposite faces 63a and 64a of cheeks 63 and 64. To that end, as is more clearly apparent in FIG. 6, the pins 61 and 62 present four peripheral beads 61h, 61i and 62h, 62i allowing contact welding.

They also comprise a deformable part 61g, 62g whose cross-section, which appears hatched in FIG. 6, has an area less than that of the cross-sections of ends 61a, 62a and of opposite ends 61b, 62b of pins 61, 62 which are intended to penetrate inside the end 53a of the connecting rod 53.

At their second ends 61b, 62b, the pins 61 and 62 present two parts 61c, 61d and 62c, 62d intended to cooperate with adjusting screws 66 and 67 to abut against the inner surface of the end 53a of the connecting rod 53. Parts 62c and 62d are separated, towards the pin 62 provided to come into contact with the inner surface of the connecting rod 53, by a recess 62j such that the surfaces of parts 62c and 62d in contact with the inner surface of the connecting rod 53 are of relatively small area, which facilitates anchoring of the pin 62 inside the end 53a of the connecting rod 53. Similarly, parts 61c and 61d of pin 61 are separated by a recess 61j.

Pins 61 and 62 are each respectively provided with two through bores 61e and 61f, and blind bores 62e and 62f, for receiving and centering the screws 66 and 67.

The upper surface 62k of the pin 62, i.e. the surface opposite pin 61, is plane, with the result that a cross-section of pin 62 is oval or in the form of a truncated ellipse. Similarly, the lower surface 61k of pin 61 is plane. The convex surfaces of pins 61 and 62 come into contact with the inner surface of the end 53a of the connecting rod 53. Pins 61' and 62' are respectively identical to pins 61 and 62.

As mentioned hereinabove, the adjusting screws 66 and 67 pass through the tapped orifices 61e and 61f of pin 61 and make it possible to adjust the distance d separating the end 61b of pin 61, intended to be housed in the connecting rod 53, from the end 62b or pin 62 inside the connecting rod 53. A similar functioning is obtained for pins 61' and 62' thanks to adjust screws 66' and 67'.

Pins 61, 62, 61' and 62' are obtained by sintering, i.e. by a reliable and economical method, with the result that the quality of the connector obtained is very satisfactory, while its cost price is attractive.

In addition, sintering enables the use of specific materials for obtaining elastic properties appropriate for the deformable parts 61g, 62g or equivalents of the pins 61, 62, 61', 62', to be envisaged.

The pins 11 and 12 of the first embodiment may, of course, also be manufactured by sintering.

What is claimed is:

1. A connector for a drawing mechanism interposed between a weaving system and heddle frames of a weaving loom and wherein the drawing mechanism includes at least one tubular connecting rod of flattened cross-section which is adapted to be coupled to at least one rocking connection lever, the connector comprising; two cheeks adapted to be disposed on either side of the lever and articulated on the lever, and at least one part adapted to penetrate and be secured in one end of the connecting rod, said at least one part adapted to penetrate being formed by two substantially parallel pins, each pin including a first end disposed between said two cheeks and welded on opposing faces of said two cheeks, and each pin including a second end adapted to be secured within the connecting rod and which second ends are spaced from said first ends by a deformable part which enables a distance separating said second ends of said pins, inside the connecting rod, to be adjusted.

2. The connector for a drawing mechanism of claim 1, wherein said pins are sintered pins.

3. The connector for a drawing mechanism of claim 1, wherein said deformable part of each pin is constituted by a zone of reduced cross-section.

4. The connector for a drawing mechanism of claim 1, where in each pin is provided, near it's second end, with a recess defining two spaced parts adapted to cooperate with adjusting means for adjusting the distance separating said second ends which abut an inner surface of the connecting rod.

5. The connector for a drawing mechanism of claim 4, wherein said parts of said pins adapted to cooperate with said adjusting means have a cross-section greater than that of the reduced cross-section of said deformable part.

6. The drawing connector for a drawing mechanism of claim 4, characterized in that said parts of said pins adapted to cooperate with said adjusting means are provided with bores for receiving adjusting screws constituting said adjusting means.

7. The connector for a drawing mechanism of claim 6, wherein said bores of a first pin are through bores tapped to a pitch of said adjusting screws, while said bores of said second pin are blind.

8. The connector for a drawing mechanism of claim 1, wherein each pin includes adjacent it's first end, at least one bead for welding on said cheeks.

9. The connector for a drawing mechanism of claim 1, wherein each cheek is is a cut-out.

10. The connector for a drawing mechanism of claim 1, including four pins adapted to cooperate with ends of two connecting rods to fasten them on a lever, said four pins being welded between said cheeks with two pins extending from one end of said cheeks and two extending from an opposite end of said cheeks.

11. The connector for a drawing mechanism of claim 1 wherein said pins are turned pins.

12. A weaving loom comprising; a weaving system connected to at least one heddle frame by way of a drawing mechanism, said at least one heddle frame being connected to a rocking lever, said drawing mechanism including at least one tubular connecting rod of flattened cross-section, a connector for connecting said rocking lever to said at least one tubular connecting rod, said connector including two cheeks, means for connecting said two cheeks on opposite sides of said rocking lever, at least two parallel pins welded to inner faces of each of said cheeks and having second ends extending outwardly therefrom, each of said second ends extending within said at least one tubular connecting rod and being spaced from said first ends by a deformable portion, and fastening means for securing said second ends of each of said pins within said at least one tubular connecting rod for adjusting a spacing between said second ends within said tubular connecting rod.

* * * * *